United States Patent
Pearson et al.

(10) Patent No.: US 7,090,772 B2
(45) Date of Patent: *Aug. 15, 2006

(54) FILTER BAG ASSEMBLY

(75) Inventors: John Franklin Pearson, Sao Bernardo Do Campo/SP (BR); Wald Lodewyckx, Stockholm (SE)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,858

(22) Filed: Mar. 15, 2005

(65) Prior Publication Data

US 2005/0155334 A1    Jul. 21, 2005

Related U.S. Application Data

(63) Continuation of application No. 10/265,288, filed on Oct. 4, 2002, now Pat. No. 6,872,309.

(51) Int. Cl.
B01D 29/35 (2006.01)

(52) U.S. Cl. ............... 210/315; 210/457; 210/489; 210/493.1; 210/495; 210/497.01; 55/380; 55/382; 55/482; 55/485; 55/521; 24/72.7; 24/711.1

(58) Field of Classification Search ............ 210/315, 210/457, 489, 493.1, 495, 497.01; 55/380, 55/382, 482, 485, 521; 24/72.7, 711.1
See application file for complete search history.

(56) References Cited

U.S. PATENT DOCUMENTS

| 2,372,865 | A | * | 4/1945 | Taylor .................. 210/493.1 |
| 3,327,859 | A | * | 6/1967 | Pall ............................ 210/266 |
| 3,757,957 | A | * | 9/1973 | Smith ......................... 210/486 |
| 4,058,463 | A | * | 11/1977 | Bartik ......................... 210/317 |
| 4,263,139 | A | * | 4/1981 | Erlich ......................... 210/169 |
| 4,347,932 | A | * | 9/1982 | Furutu ......................... 206/343 |
| 4,793,922 | A | * | 12/1988 | Morton ....................... 210/317 |
| 4,804,466 | A | * | 2/1989 | Cooper et al. ............... 210/168 |
| 4,877,526 | A | * | 10/1989 | Johnson et al. ............. 210/448 |
| 5,036,231 | A | * | 7/1991 | Kanbara ...................... 327/55 |
| 5,098,565 | A | * | 3/1992 | Drori .......................... 210/346 |
| 5,213,684 | A | * | 5/1993 | Drori .......................... 210/346 |
| 5,306,321 | A | * | 4/1994 | Osendorf ..................... 55/487 |
| 5,358,638 | A | * | 10/1994 | Gershenson ................. 210/448 |
| 5,417,855 | A |   | 5/1995 | Gershenson |
| 5,549,826 | A | * | 8/1996 | Lapoint, Jr. ................. 210/489 |
| 5,552,048 | A | * | 9/1996 | Miller et al. ................. 210/489 |

(Continued)

FOREIGN PATENT DOCUMENTS

FR        1544766    * 11/1968    ............. 210/493.1

(Continued)

OTHER PUBLICATIONS

Written Opinion dated Aug. 3, 2004, issued in connection with International Patent Application No. PCT/US2003/032140.

*Primary Examiner*—Duane Smith
*Assistant Examiner*—Minh-Chau T. Pham
(74) *Attorney, Agent, or Firm*—Daniel S. Kalka

(57) ABSTRACT

A filter bag assembly includes an outer bag having an open end, a closed end opposite the open end, and a longitudinal axis. The open end of the outer bag is sized and shaped for receiving liquid to be filtered. A filter member is loosely mounted in the outer bag and has a pair of opposed open ends and a plurality of longitudinally extending pleats. Each of the pleats projects generally outwardly in a radial direction.

21 Claims, 7 Drawing Sheets

U.S. PATENT DOCUMENTS

| | | | |
|---|---|---|---|
| 5,591,338 A * | 1/1997 | Pruette et al. | 210/493.1 |
| 5,736,041 A * | 4/1998 | Skov | 210/445 |
| 5,755,962 A * | 5/1998 | Gershenson et al. | 210/452 |
| 5,762,792 A * | 6/1998 | Yamazaki | 210/323.2 |
| 5,814,218 A * | 9/1998 | Cagle | 210/388 |
| 5,876,601 A * | 3/1999 | Geibel et al. | 210/493.1 |
| 5,988,400 A * | 11/1999 | Karachevtcev et al. | 210/483 |
| 6,872,309 B1 * | 3/2005 | Pearson et al. | 210/315 |
| 2002/0027100 A1 * | 3/2002 | Gershenson | 210/342 |

FOREIGN PATENT DOCUMENTS

WO    WO 2004/033068 A1    4/2004

\* cited by examiner

FILTER BAG ASSEMBLY

This application is a continuation of U. S. patent application Ser. No. 10/265,288, filed Oct. 4, 2002, now U.S. Pat. No. 6,872,309 B2.

FIELD OF THE INVENTION

The present invention relates to filter bag assemblies and, more particularly, to a filter bag assembly having a pleated filter member.

BACKGROUND OF THE INVENTION

Bag filters have been used in the past for filtering fluids (see, for instance, U.S. Pat. Nos. 5,358,638, 5,417,855 and 5,755,962). Conventional bag filters, however, have a relatively limited area of flow and filtration and hence have a limited operating life.

Attempts have been made to provide filters with an enhanced operating life and efficiency. For instance, U.S. Pat. Nos. 5,358,638 and 5,755,962 disclose filter bag subassemblies having a plurality of filtering layers, while U.S. Pat. No. 4,877,526 discloses a flexible filter bag having a strip of flexible filtering fabric wound itself in a large number of convolutions. Moreover, U.S. Patent Publication No. U.S. 2002/0027100 relates to a filter element assembly having at least two cylindrically shaped and concentrically arranged filter media sleeves, while a pleated filter cartridge sold by Rosedale Products, Inc. has rigid pleating for filtering fluids (see, also, U.S. Pat. Nos. 5,036,321, 5,552,048, 5,762,792 and 5,988,400 for pleated filter cartridges). In addition, U.S. Pat. No. 5,549,826 discloses a filtration bag having an outer fabric sleeve and an inner fabric sleeve, which has a pleated configuration. It is, however, believed that the foregoing filter devices have various shortcomings and disadvantages (e.g., they do not provide a sufficiently large filtering surface and/or are relatively expensive to manufacture and/or use).

SUMMARY OF THE INVENTION

The present invention overcomes the disadvantages and shortcomings discussed above by providing an improved filter bag assembly. More particularly, the filter bag assembly includes an outer bag having an open end, a closed end opposite the open end, and a longitudinal axis. The open end of the outer bag is sized and shaped for receiving liquid to be filtered. A filter member is loosely mounted in the outer bag and has a pair of opposed open ends and a plurality of longitudinally extending pleats. Each of the pleats projects generally outwardly in a radial direction.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Figure 1:
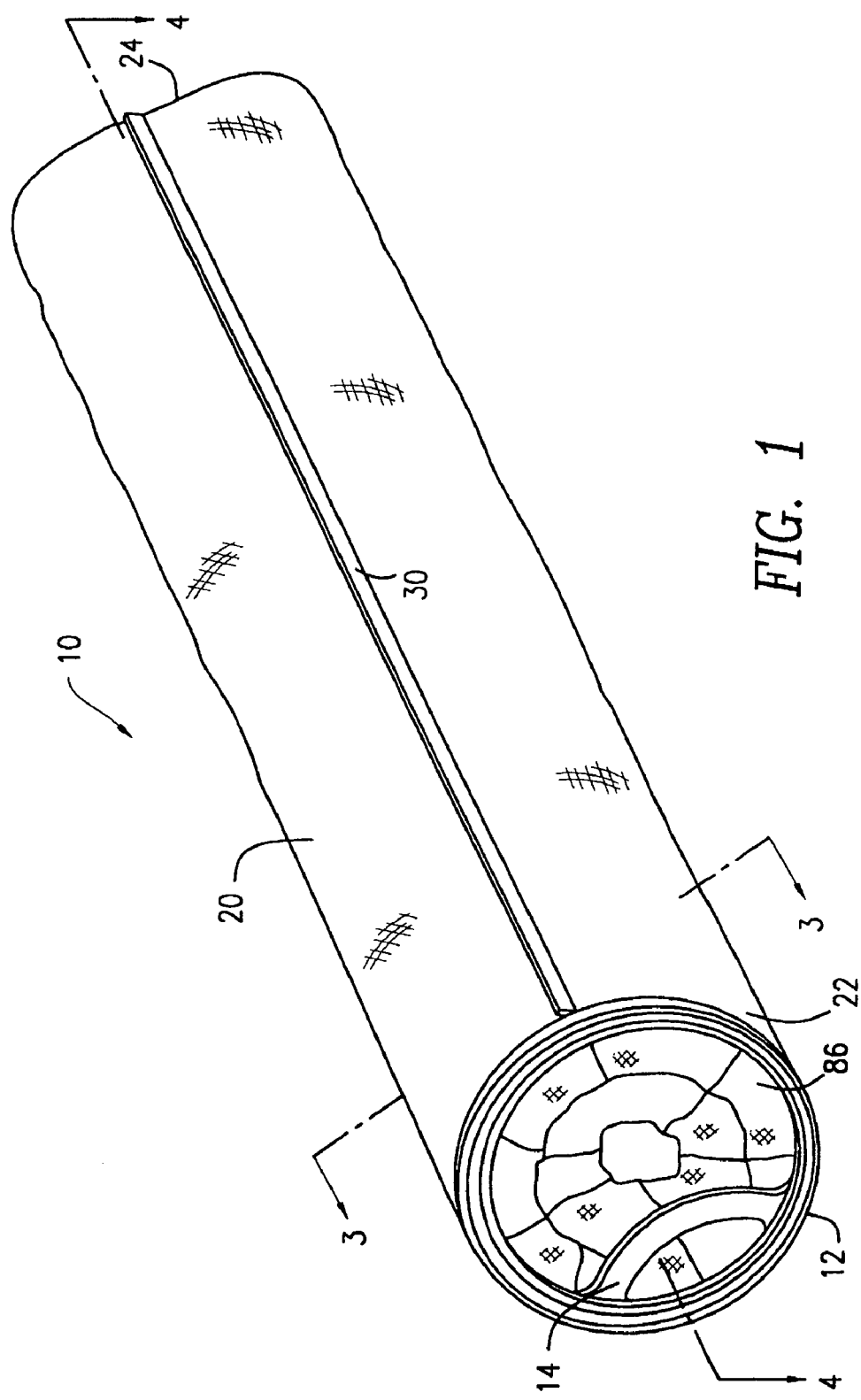
FIG. 1 is a perspective view of a filter bag assembly constructed in accordance with the present invention.
Figure 2:
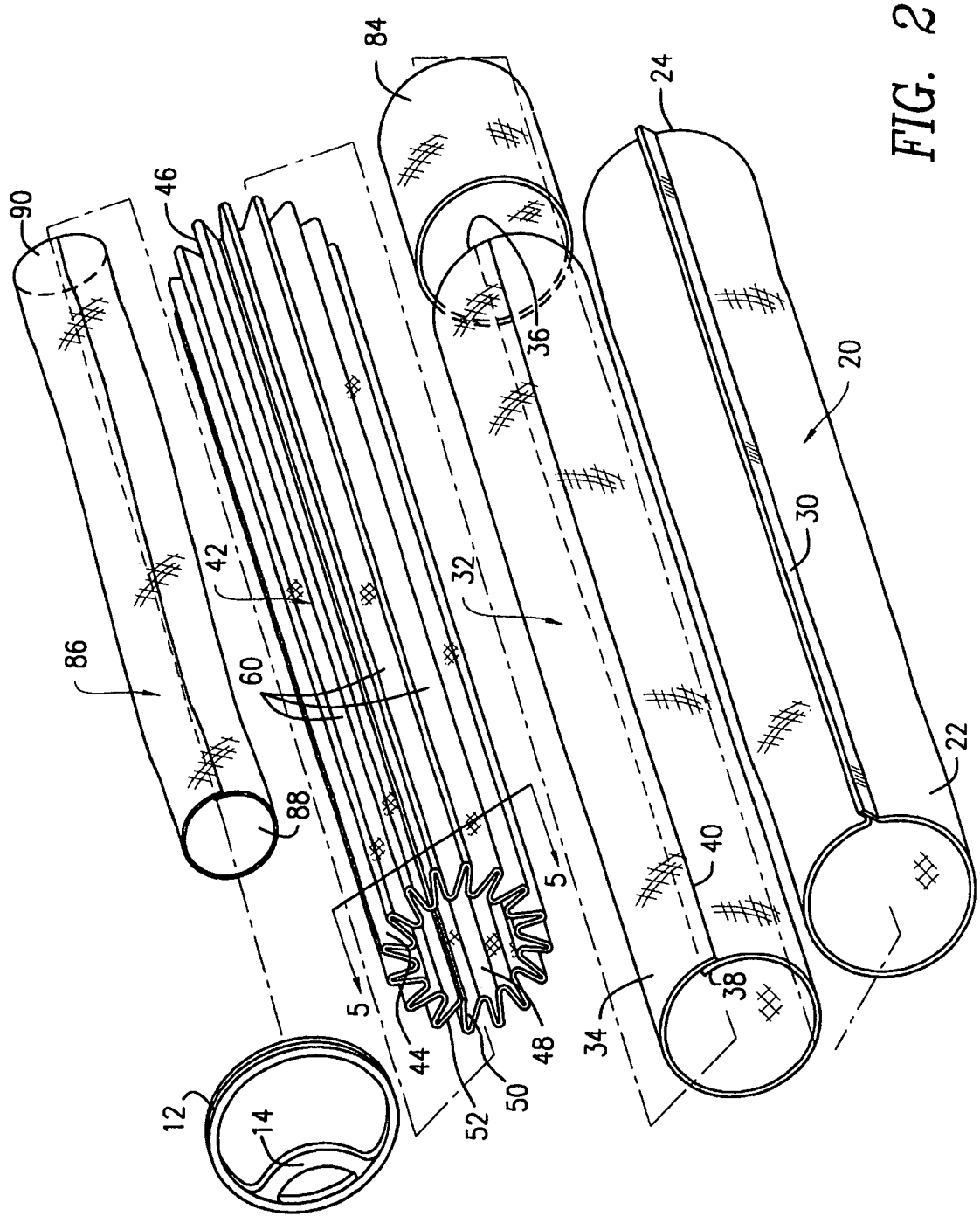
FIG. 2 is an exploded perspective view of the filter assembly shown in FIG. 1.
Figure 4:
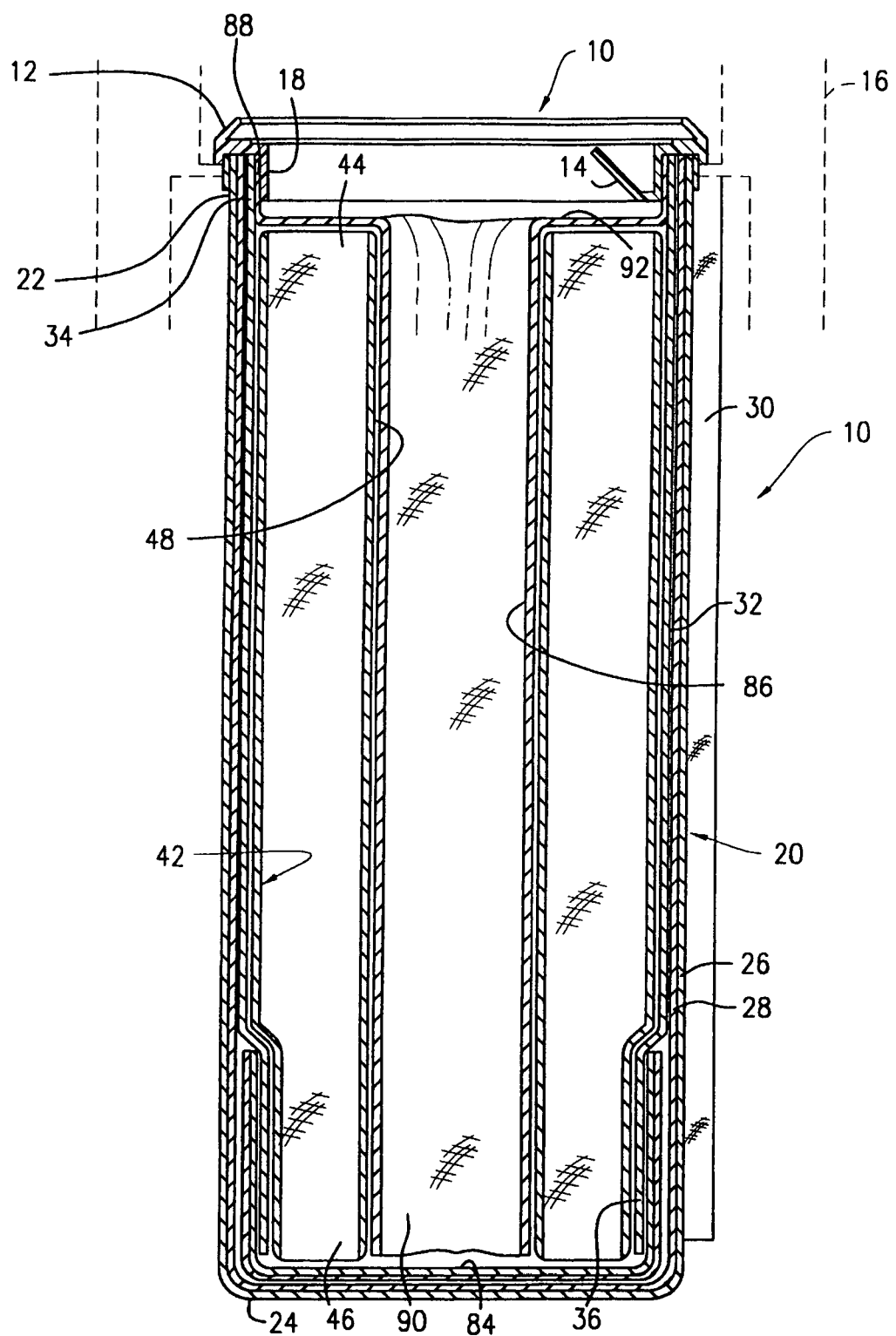
FIG. 4 is a cross-sectional view, taken along section line 4—4 and looking in the direction of the arrows, of the filter assembly shown in FIG. 1, the filter bag assembly being mounted on a filter housing.

Referring to FIGS. 1, 2 and 4, there is shown a filter bag assembly 10 constructed in accordance with the present invention. More particularly, the filter assembly 10, which is adapted to remove particulate matters (e.g., dirt, oil, sludge, etc.) from a fluid or liquid stream passing therethrough, includes a sealing ring 12 having a construction similar to those of conventional sealing rings. For instance, the sealing ring 12 can be provided with a handle 14 integrally attached to the sealing ring 12 for use in mounting and removing the filter assembly 10 from a filter housing 16 (see FIG. 4). The sealing ring 12 can also include a mounting skirt 18 depending therefrom.

Now referring to FIGS. 1–4, the filter assembly 10 is equipped with an outer bag 20 having an open proximal end 22 and a closed distal end 24. The open proximal end 22 is attached to the skirt 18 of the sealing ring 12 in a conventional manner. The outer bag 20 includes a pair of filtering layers 26, 28. Alternatively, the outer bag 20 can be made from a single layer of filtering media. Longitudinal edges of the layers 26, 28 are joined together in a conventional manner to form a sealed longitudinal edge 30 (see FIG. 3).

Figure 3:
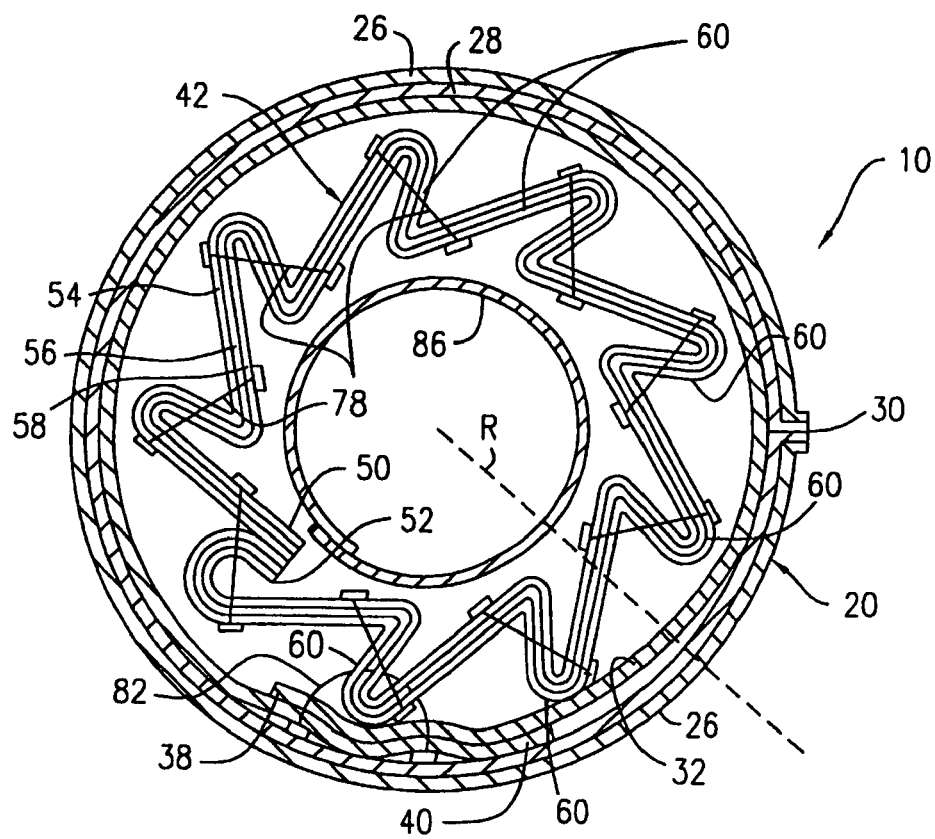
FIG. 3 is a cross-sectional view, taken along section line 3—3 and looking in the direction of the arrows, of the filter assembly shown in FIG. 1.

With reference to FIGS. 2, 3 and 4, an intermediate sleeve 32 is mounted within the outer bag 20. More particularly, the intermediate sleeve 32 has an open proximal end 34 and an open distal end 36 and is made from a single sheet of filtering media. The proximal end 34 of the intermediate sleeve 32 is attached to the skirt 18 of the sealing ring 12 in a conventional manner together with the proximal end 22 of the outer bag 20 (see FIG. 4). The intermediate sleeve 32 also includes a pair of longitudinal sides 38, 40 loosely attached to each other to form a circularly shaped enclosure.

Still referring to FIGS. 2, 3 and 4, the filter assembly 10 is also equipped with a pleated filter member 42 mounted within the intermediate sleeve 32 and having an open proximal end 44, an open distal end 46. More particularly, the pleated filter member 42 is loosely mounted in the intermediate sleeve 32 and is hence self-supporting (i.e., it is not stitched or otherwise physically attached to the intermediate sleeve 32). An opening 48 extends between the proximal and distal ends 44, 46. The pleated filter member 42 has a pair of longitudinally extending sides (i.e., longitudinal edges) 50, 52, which extend inwardly and are positioned relative to each other in abutting fashion such that the pleated filter member 42 is provided with a generally columnar structure (i.e., cylindrical shape). The pleated filter member 42 is also provided with an outer layer 54, an intermediate layer 56 and an inner layer 58. More particularly, each of the inner layer 58 and the outer layer 54 is made from a conventional flexible permeable non-woven fabric, (e.g., flexible mesh material), while the intermediate layer 56 is made from a conventional flexible filtering material. The outer, intermediate and inner layers 54, 56, 58 are folded together so as to form a plurality of pleats 60 extending longitudinally between the proximal and distal ends 44, 46. As a result, folds of filtering media (i.e., the intermediate layer 56) are formed between non-woven fabric layers (i.e., the outer and inner layers 54, 58). Each of the pleats 60 has a peak 62 and a pair of valleys 64 and is slanted relative to an associated radial axis R (see FIG. 3) such that it has a substantially flattened orientation and extend above an adjacent one of the pleats 60. In other words, each of the pleats 60 has an elongated side 66 and a shortened side 68 substantially smaller than that of the elongated side 66 such that both of its valleys 64 are positioned on one side of its peak 62. Each of the elongated sides 66 has inner and outer surfaces 70, 72, while each of the shortened sides 68 has inner and outer surfaces 74, 76. Alternatively, the pleats 60 can be oriented and/or shaped in a different manner.

Figure 5:
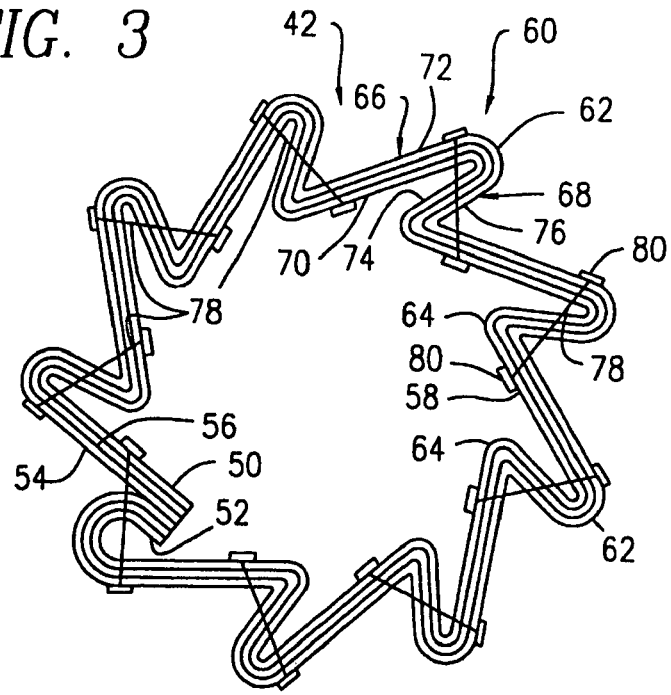
FIG. 5 is a cross-sectional view, taken along section line 5—5 and looking in the direction of the arrows, of a pleated filter member of the filter assembly shown in FIG. 2.
Figure 7:
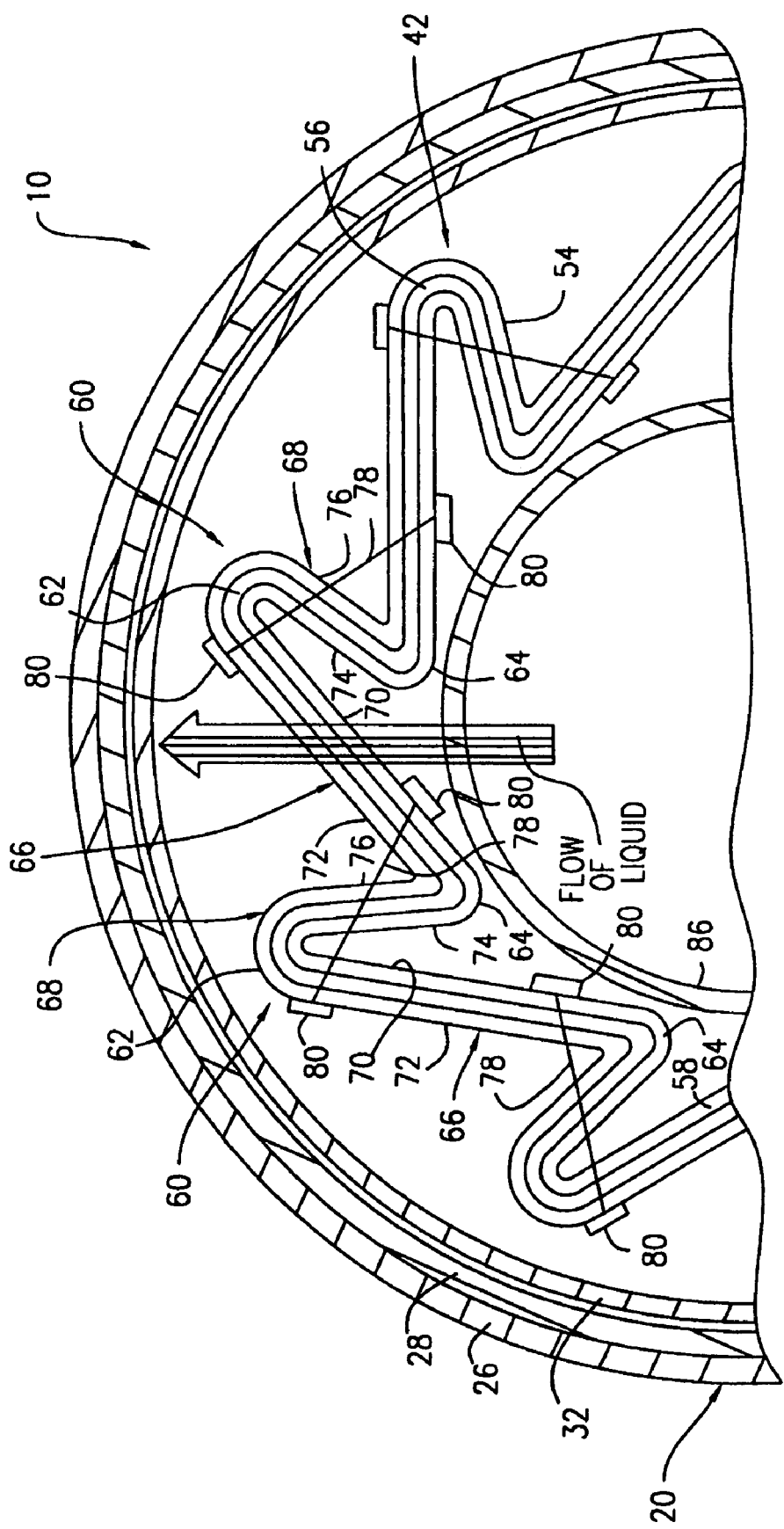
FIG. 7 is an enlarged sectional view of the filter assembly shown in FIG. 3.

Referring now to FIGS. 3, 5 and 7, the pleated filter member 42 is also provided with a plurality of sets of tags or pleat stabilizers 78. The tags 78 of each set are attached to an adjacent pair of the pleats 60 and arranged in a spaced manner from one another between the proximal and distal ends 44, 46 of the pleated filter member 42 so as to maintain the slanted or flattened orientation of the pleats 60. More particularly, each of the tags 78 extends from the outer surface 72 of the elongated side 66 of a corresponding one of the pleats 60, penetrates completely through the pleat 60 and terminates at the inner surface 70 of the elongated side 66 of an adjacent one of the pleats 60. Heads 80 are provided on each of the tags 78 at ends thereof so as to affix same to a corresponding pair of the pleats 60. Some of the tags 78 extend through the sides (i.e., longitudinal edges) 50, 52 of the pleated filter member 42 for loosely attaching them to one another.

Figure 6:
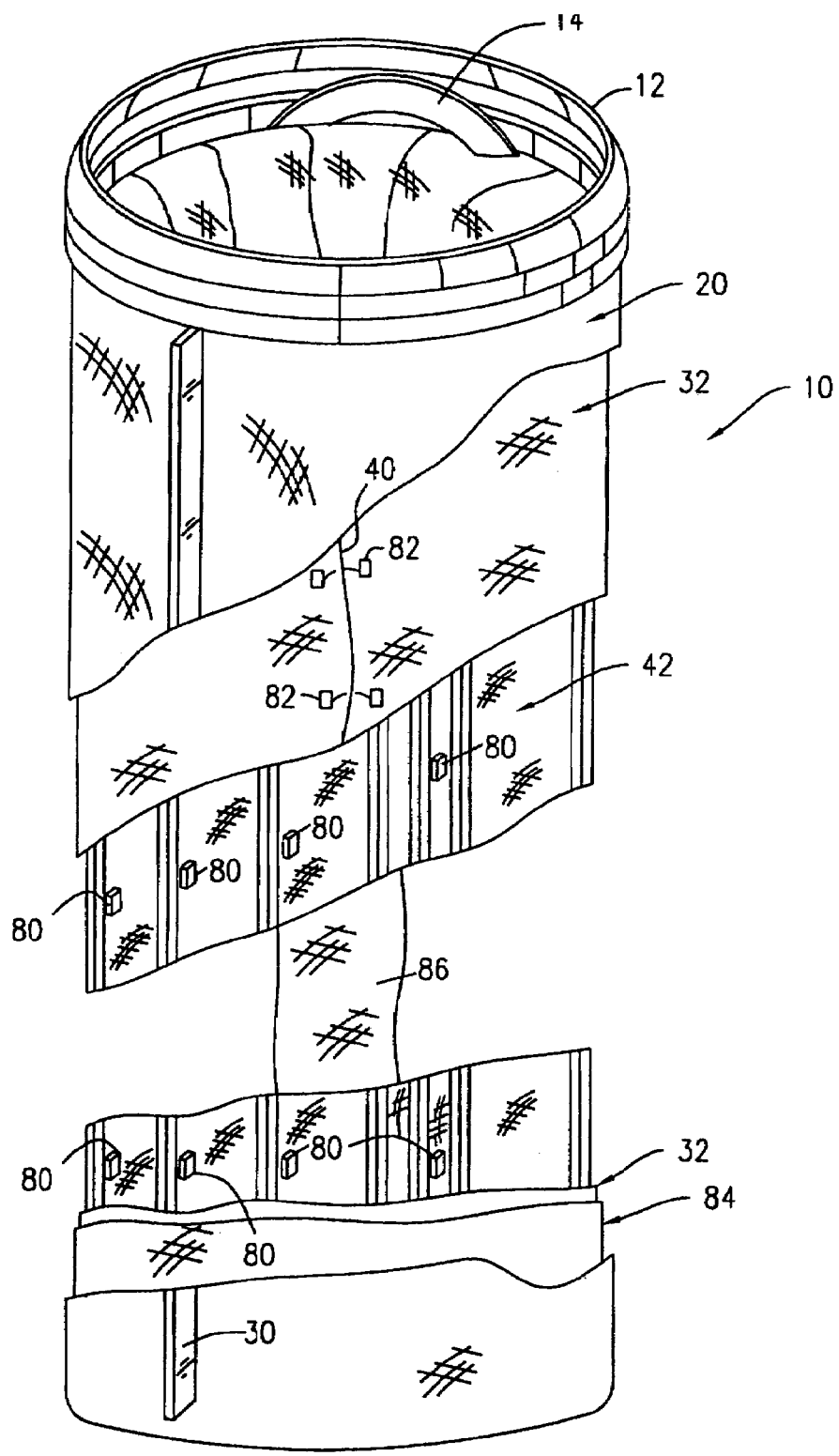
FIG. 6 is a perspective view of the filter assembly of FIG. 1 partially broken away to show various layers of the filter bag assembly.

With reference to FIGS. 2, 3 and 6, the intermediate sleeve 32 is wrapped around the pleated filter member 42. More particularly, the sides 38, 40 of the intermediate sleeve 32 overlap one another and are affixed to one of the pleats 60 such that the intermediate sleeve 32 is loosely attached to the pleated filter member 42 (see FIG. 3). In this regard, tags 82 are used to attach the sides 38, 40 of the intermediate sleeve 32 to one of the pleats 60.

Figure 4A:
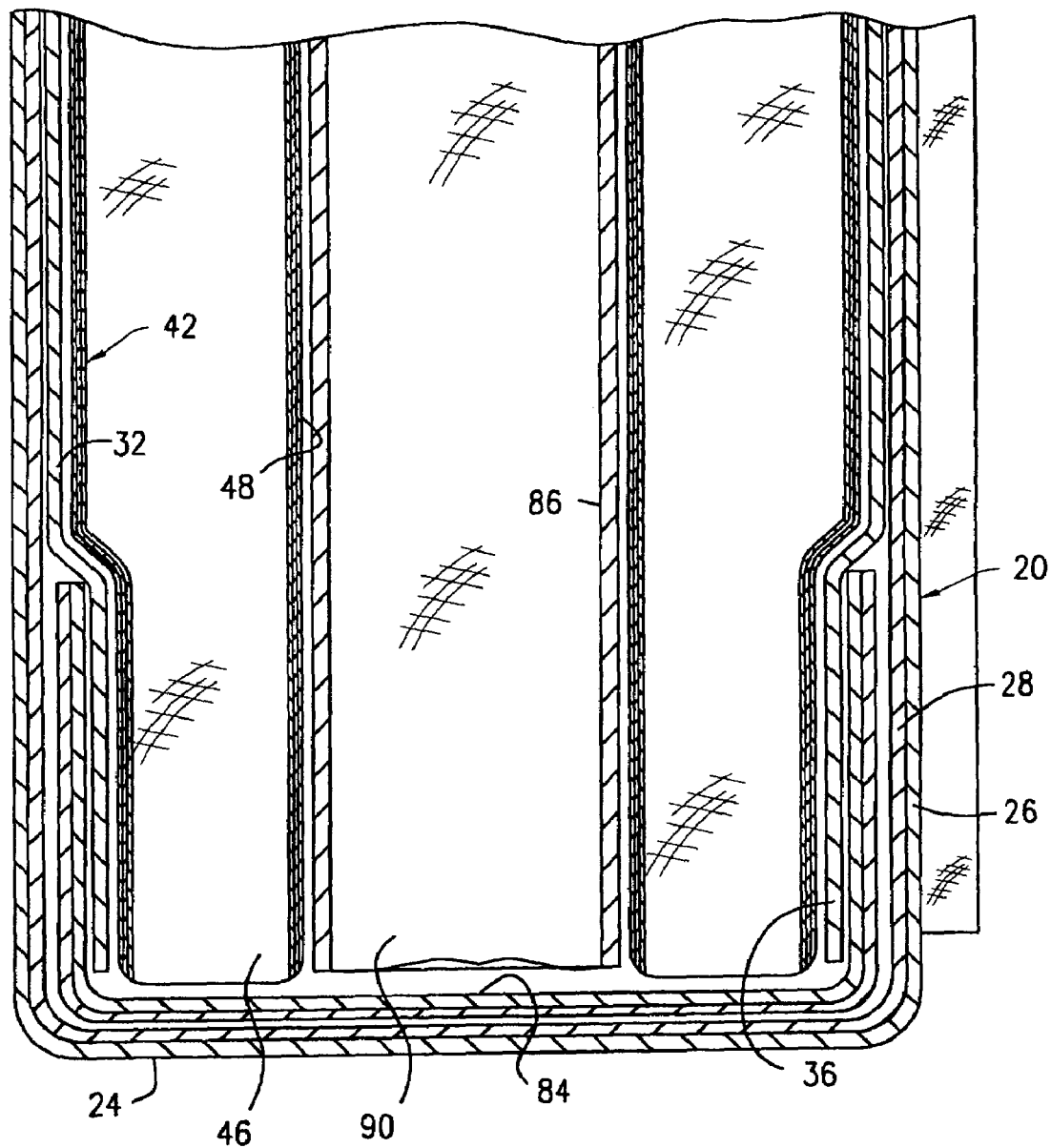
FIG. 4a is an enlarged view of a lower portion of the filter bag assembly shown in FIG. 4.

Now referring to FIGS. 2, 4 and 4a, an inner end cover 84 is positioned in the outer bag 20 at the distal end 24 thereof. The open distal ends 36, 46 of the intermediate sleeve 32 and the pleated filter member 42, respectively, are received in the inner cover 84 such that they are closed off by the inner cover 84. The inner cover 84 includes a pair of filtering layers.

An inner sleeve 86 is also mounted within the opening 48 of the pleated filter member 42 (see FIGS. 2–4). More particularly, the inner sleeve 86, which has an open proximal end 88 and an open distal end 90, is preferably constructed as a single filtering layer to perform a pre-filtering function. The proximal end 88 is attached to the skirt 18 of the sealing ring 12 (see FIG. 4) in a conventional manner. The inner sleeve 86 also includes a cover portion 92 (see FIG. 4) adjacent the proximal end 88 for overlying and hence covering the proximal end 44 of the pleated filter member 42.

In use, the filter assembly 10 is mounted within the filter housing 16 (see FIG. 4) such that liquid to be filtered can flow into the filter assembly 10 through the open proximal end 88 of the inner sleeve 86. After entering the filter assembly 10, the liquid flows radially outwardly through the inner sleeve 86 and then through the pleats 60 of the pleated filter member 42. The liquid then exits the filter assembly 10 through the intermediate sleeve 32, the end cover 84 and the outer bag 20.

It should be appreciated that the present invention provides numerous advantages over the prior art discussed above. For instance, because the folds of the intermediate layer 56 of the pleated filter member 42 are formed between the outer and inner non-woven fabric layers 54, 58, when they lay on top of one another, the inner and outer layers 54, 58 cooperate to keep the folds separated from each other. In this manner, liquid to be filtered can pass through the entire surface area of the intermediate layer 56 (i.e., a filtering layer), thereby enhancing the dirt holding capacity of the filter assembly 10. In this regard, while the intermediate layer 56 can be provide with any surface area size to suit varying requirements and/or needs, an approximately 1.2 m$^2$ surface area has been found to be particularly suitable for use in connection with the present invention. Moreover, the geometry of the pleats 60 provides a parallel/through flow between the pleats, exposing liquid to both the surface area and depth of the media (see FIG. 7). In addition, because the pleated construction of the pleated filter member 42 is maintained solely by the tags 78, the pleated filter member can be made from any filtering materials (e.g. flexible filtering materials), including those which were not previously suitable for use in pleated or non-pleated filters. Further, the tags 78 permit easy handling and manufacturing of the pleated filter member 42.

It should be noted that the present invention can have numerous variations and modifications. For instance, the outer non-woven fabric layer 54 and/or the inner non-woven fabric layer 58 of the pleated filter member 42 can be made from a lighter material, such as a rigid mesh, in order to minimize the bulkiness of the pleated filter member 42 without significantly compromising the filtering capacity of the filter assembly 10. In addition, while the pleated filter member 42 illustrated in FIGS. 1–7 is used as a pre-filter, the filter assembly 10 can be modified such that the pleated filter member 42 is used as a final filter. The pleated filter member 42 and/or the filter assembly 10 can also be inserted into a conventional filter bag so as to increase the operating life and/or efficiency of the conventional filter bag. The pleated filter member 42 can also be assembled manually or semi-automatically (e.g., using a semi-automatic tooling or equipment). One or more the outer bag 20, the intermediate sleeve 32, the end cover 84 and the inner sleeve 86 can be eliminated. Further, the outer bag 20, the intermediate sleeve 32, the end cover 84 and the inner sleeve 86 can be provided with a different construction.

It will be understood that the embodiment described herein is merely exemplary and that a person skilled in the art may make many variations and modifications without departing from the spirit and scope of the invention. All such variations and modifications, including those discussed above, are intended to be included within the scope of the invention as defined by the appended claims.

We claim:

1. A filter bag assembly comprising an outer bag including an open end and a closed end opposite said open end and having a longitudinal axis, said open end being sized and shaped for receiving liquid to be filtered; a filter member mounted in said outer bag and having a pair of opposed open ends and a plurality of longitudinally extending pleats, each of said pleats projecting generally outwardly in a radial direction; an inner sleeve having an open end and a section which is mounted within said filter member for covering an inner side of said filter member; and a ring including a skirt attached to said open end of said outer bag and to said open end of said inner sleeve.

2. The filter bag assembly of claim 1, wherein said filter member is substantially coaxial with respect to said outer bag.

3. The filter bag assembly of claim 2, wherein each of said pleats extends between said open ends of said filter member.

4. The filter bag assembly of claim 1, wherein one of said open ends of said filter member is positioned adjacent to said ring, and the other of said open ends of said filter member is positioned adjacent to said closed end of said outer bag.

5. The filter bag assembly of claim 4, further comprising an inner layer having an end, which is attached to said ring, said inner layer including a portion positioned in said filter member through said one of said open ends of said filter member.

6. The filter bag assembly of claim 5, further comprising an intermediate layer wrapped around said filter member and having a first end, which is attached to said ring, and a second end, which is positioned adjacent to said other one of said open ends of said filter member.

7. The filter bag assembly of claim 6, further comprising a cap mounted in said outer bag, said cap having an open end for receiving said other one of said open ends of said filter member.

8. The filter bag assembly of claim 1, wherein said filter member has a generally cylindrical shape.

9. The filter bag assembly of claim 1, wherein said filter member is self-supporting.

10. The filter bag assembly of claim 1, wherein said filter member includes maintaining means for maintaining the pleated construction of said filter member.

11. The filter bag assembly of claim 10, wherein said maintaining means includes a plurality of tags, each of which is connected to an adjacent pair of said pleats.

12. The filter bag assembly of claim 11, wherein each of said tags extends from an outer side of one of said adjacent pair of said pleats, penetrates through said one of said adjacent pair of said pleats and terminates at an inner side of the other one of said adjacent pair of said pleats.

13. The filter bag assembly of claim 1, wherein said filter member includes a filter sheet folded in a predetermined manner so as to form said pleats.

14. The filter bag assembly of claim 13, wherein said filter sheet has a pair of longitudinal edges attached to one another such that the filter member is provided with a generally cylindrical shape, said filter member including a plurality of tags for loosely attaching said longitudinal edges of said filter sheet to one another.

15. The filter bag assembly of claim 14, wherein said filter member includes an inner sheet and an outer sheet, said filter sheet being interposed between said inner and outer sheets, said inner and outer sheets being folded together with said filter sheet so as to form said pleats.

16. The filter bag assembly of claim 15, wherein said pleats are kept separated by said inner and outer sheets.

17. The filter bag assembly of claim 16, wherein said filter sheet is made from a flexible woven material.

18. The filter bag assembly of claim 17, wherein said inner and outer sheets are made from a flexible non-woven material.

19. The filter bag assembly of claim 17, wherein at least one of said inner and outer sheets is made from a flexible mesh material.

20. The filter bag assembly of claim 1, wherein each of said pleats is slanted relative to a corresponding radial axis of said filter member such that it has at least one portion which overlaps with an adjacent one of said pleats.

21. The filter bag assembly of claim 20, wherein each of said pleats includes first and second sides, each of said first sides having a size greater than that of a corresponding one of said second sides.

\* \* \* \* \*